(12) United States Patent  
Inoue et al.

(10) Patent No.: US 8,786,975 B2  
(45) Date of Patent: Jul. 22, 2014

(54) THIN-FEMTO MAGNETIC HEAD SLIDER AND METHOD FOR PRODUCING THE SAME

(75) Inventors: Tomomitsu Inoue, Odawara (JP); Hideo Yamakura, Yokohama (JP); Takateru Seki, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 267 days.

(21) Appl. No.: 13/104,830

(22) Filed: May 10, 2011

(65) Prior Publication Data

US 2012/0287530 A1 Nov. 15, 2012

(51) Int. Cl.
*G11B 21/21* (2006.01)

(52) U.S. Cl.
USPC .......................................... 360/75; 360/234.5

(58) Field of Classification Search
USPC .......... 360/234.5, 128, 317, 75, 125.7, 125.3, 360/123.1, 123.36, 245.8
See application file for complete search history.

(56) References Cited

U.S. PATENT DOCUMENTS

| | | | | |
|---|---|---|---|---|
| 5,293,288 A * | 3/1994 | Ishikawa et al. | ........... | 360/234.5 |
| 5,494,473 A * | 2/1996 | Dupuis et al. | ...................... | 451/1 |
| 5,638,237 A * | 6/1997 | Phipps et al. | .................. | 360/128 |
| 6,623,330 B2 * | 9/2003 | Fukuroi | ............... | 451/5 |
| 6,793,557 B2 * | 9/2004 | Bunch et al. | ....................... | 451/5 |
| 7,014,530 B2 | 3/2006 | Kasiraj et al. | | |
| 7,119,995 B2 * | 10/2006 | Granstrom et al. | ........... | 360/323 |
| 7,272,883 B2 | 9/2007 | Le et al. | | |
| 7,469,468 B1 * | 12/2008 | Cross et al. | .................. | 29/603.16 |
| 7,551,406 B1 * | 6/2009 | Thomas et al. | ............... | 360/317 |
| 7,643,250 B2 | 1/2010 | Araki et al. | | |
| 2002/0066177 A1 * | 6/2002 | Takada et al. | ............... | 29/603.07 |
| 2005/0128638 A1 | 6/2005 | Koeppe et al. | | |
| 2005/0219753 A1 | 10/2005 | Yamakura et al. | | |
| 2006/0132978 A1 | 6/2006 | Tian et al. | | |
| 2007/0097557 A1 * | 5/2007 | Seagle | .......................... | 360/323 |
| 2008/0062565 A1 | 3/2008 | Umezaki et al. | | |

FOREIGN PATENT DOCUMENTS

| | | | |
|---|---|---|---|
| JP | 2006344381 A | * | 12/2006 |
| JP | 2009099219 A | * | 5/2009 |

* cited by examiner

*Primary Examiner* — Julie Anne Watko
(74) *Attorney, Agent, or Firm* — Zilka-Kotab, PC

(57) ABSTRACT

In one embodiment, a magnetic head slider includes a substrate, at least two elements (read element, write element, and/or heater element) positioned adjacent to the substrate, a resistance detection element positioned near the two elements, a pair of conductive terminals in an accessible position and coupled to each of the two elements, a protective film surrounding the two elements and the resistance detection element, a first and a second thin conductive wire extending from the resistance detection element and terminating at an edge of the protective film, a third thin conductive wire extending from one of the pair of conductive terminals for a first of the two elements and terminating at an edge of the protective film, and a fourth thin conductive wire extending from one of the pair of conductive terminals for a second of the two elements and terminating at an edge of the protective film.

16 Claims, 7 Drawing Sheets

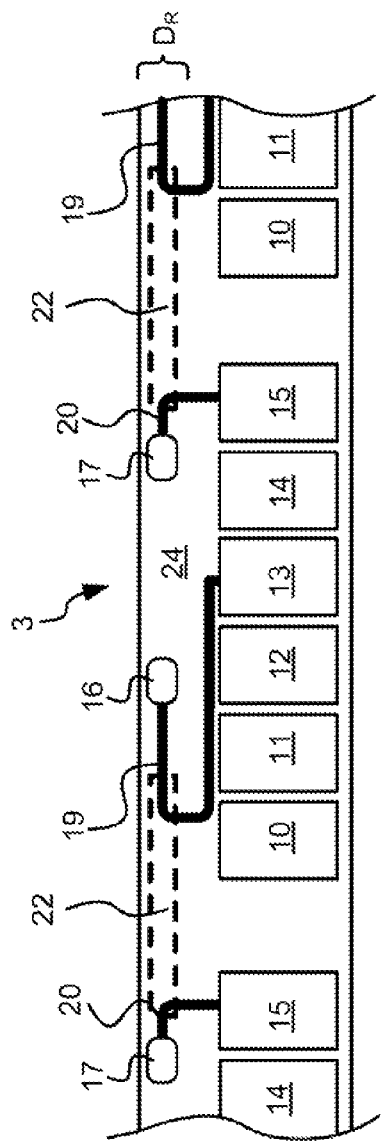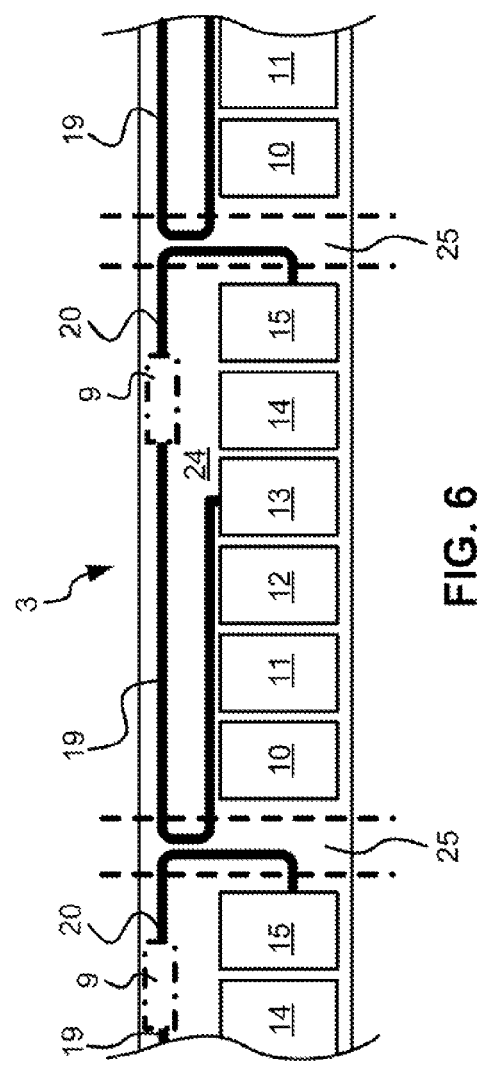

THIN-FEMTO MAGNETIC HEAD SLIDER AND METHOD FOR PRODUCING THE SAME

FIELD OF THE INVENTION

The present invention relates to manufacturing method for a magnetic head, a magnetic head slider, and a magnetic head gimbal assembly, and more specifically, to the high-density mounting of conductive terminals on a thin-femto slider.

BACKGROUND OF THE INVENTION

Hard disk drives (HDDs) have become the preeminent mass storage medium in the field of digital information storage. A HDD includes one or more magnetic heads produced in a magnetic head slider positioned at the end of a gimbal for reading from/writing to a magnetic disk which stores magnetic information. Magnetic information is written to and read from the magnetic disk while the magnetic head slider flies only a few nanometers above the magnetic disk being rotated by a spindle motor. Being able to produce smaller read and write elements, which are embedded in the magnetic head, and using a lower flying height of the magnetic head slider are possible ways to achieve higher recording densities on a HDD. Higher precision is sought in the dimensional precision of the elements as the elements become smaller, however, and in particular, the precision demanded for the element height, the dimension in the direction of the read and write elements away from the magnetic disk, is on the order of nanometers. The element height is determined in the process that forms the air bearing surface (ABS) through polishing the ABS of the magnetic head slider. However, in order to achieve the demanded precision in this process, as disclosed in Japanese Unexamined Patent Application Publication No. 2006-344381, the resistance of a resistance detection element formed in the vicinity of the read element of the magnetic head slider is measured during the process, and the element heights are processed with high precision based on the reading. On the other hand, as disclosed in Japanese Unexamined Patent Application Publication No. 2009-99219, to further lower the flying height, a heater element is embedded in the magnetic head slider to thermally expand the read and write elements to make contact with the magnetic disk, and the current flow applied to the heater element is controlled so that the elements fly at the prescribed height from a contact point with the magnetic disk. The read element, write element, resistance detection element, and heater element are connected by lead wires to gold terminals formed on the side surface of the magnetic head slider. In one prior art example, at least eight gold terminals are formed in the side surface of the magnetic head slider.

SUMMARY OF THE INVENTION

In one embodiment, a magnetic head slider includes a substrate; at least two elements positioned adjacent to the substrate, the elements being selected from a group consisting of: a read element, a write element, and a heater element; a resistance detection element positioned near the at least two elements; a pair of conductive terminals for each of the at least two elements, the pair of conductive terminals being in an accessible position and being coupled to each of the at least two elements; a protective film surrounding the at least two elements and the resistance detection element; a first and a second thin conductive wire extending from the resistance detection element and terminating at an edge of the protective film; a third thin conductive wire extending from one of the pair of conductive terminals for a first of the at least two elements and terminating at an edge of the protective film; and a fourth thin conductive wire extending from one of the pair of conductive terminals for a second of the at least two elements and terminating at an edge of the protective film.

In another embodiment, a magnetic head slider includes a substrate; at least two elements positioned adjacent to the substrate, the elements being selected from a group consisting of: a read element, a write element, and a heater element; a resistance detection element positioned near the at least two elements; a pair of conductive terminals for each of the at least two elements, the pair of conductive terminals being in an accessible position and being coupled to each of the at least two elements; a protective film surrounding the at least two elements and the resistance detection element; a first thin conductive wire extending from the resistance detection element and terminating at one of a pair of conductive terminals for a first of the at least two elements, wherein the first thin conductive wire may be interrupted by a gap at a position between the resistance detection element and the one of the pair of conductive terminals for the first of the at least two elements; and a second thin conductive wire extending from the resistance detection element and terminating at one of a pair of conductive terminals for a second of the at least two elements, wherein the second thin conductive wire may be interrupted by a gap at a position between the resistance detection element and the one of the pair of conductive terminals for the second of the at least two elements.

In another embodiment, a method for producing magnetic head sliders includes forming at least two elements for each magnetic head slider above a substrate wafer, the at least two elements being selected from a group consisting of: a read element, a write element, and a heater element; forming, for each magnetic head slider, a resistance detection element above the substrate wafer near the at least two elements; forming, above the substrate wafer, a pair of conductive terminals for each of the at least two elements, the pair of conductive terminals being coupled to each of the at least two elements; coupling, using a first thin conductive wire, the resistance detection element for each magnetic head slider to one of a pair of conductive terminals for a first of the at least two elements; coupling the resistance detection element (using a second thin conductive wire) of each magnetic head slider to one of a pair of conductive terminals for a second of at least two elements; slicing the substrate wafer into a plurality of row-bars, each row-bar having a plurality of magnetic head sliders; polishing an air-bearing surface of the plurality of row-bars to provide a uniform element height to the plurality of magnetic head sliders of each row-bar while measuring a resistance of the resistance detection element for each magnetic head slider; and severing the first and second thin conductive wires to decouple the resistance detection element from the first and second of the at least two elements for each magnetic head slider.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a cross-sectional schematic view of a thin-femto magnetic head slider prior to being sliced from a row-bar, according to some embodiments.

FIG. 6 is a cross-sectional schematic view of a thin-femto magnetic head slider prior to being sliced from a row-bar, according to various embodiments.

DETAILED DESCRIPTION

Figure 1:
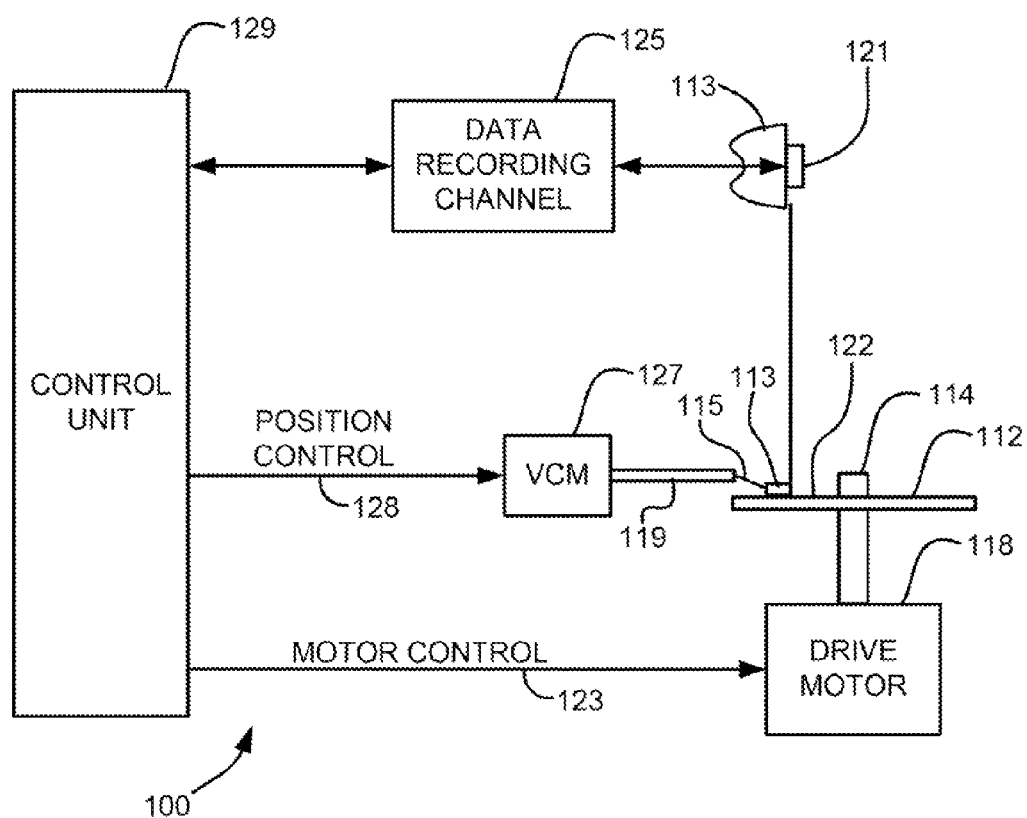
FIG. 1 is a simplified drawing of a magnetic recording disk drive system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head slider includes a substrate; at least two elements positioned adjacent to the substrate, the elements being selected from a group consisting of a read element, a write element, and a heater element; a resistance detection element positioned near the at least two elements; a pair of conductive terminals for each of the at least two elements, the pair of conductive terminals being in an accessible position and being coupled to each of the at least two elements; a protective film surrounding the at least two elements and the resistance detection element; a first and a second thin conductive wire extending from the resistance detection element and terminating at an edge of the protective film; a third thin conductive wire extending from one of the pair of conductive terminals for a first of the at least two elements and terminating at an edge of the protective film; and a fourth thin conductive wire extending from one of the pair of conductive terminals for a second of the at least two elements and terminating at an edge of the protective film.

In another general embodiment, a magnetic head slider includes a substrate; at least two elements positioned adjacent to the substrate, the elements being selected from a group consisting of: a read element, a write element, and a heater element; a resistance detection element positioned near the at least two elements; a pair of conductive terminals for each of the at least two elements, the pair of conductive terminals being in an accessible position and being coupled to each of the at least two elements; a protective film surrounding the at least two elements and the resistance detection element; a first thin conductive wire extending from the resistance detection element and terminating at one of a pair of conductive terminals for a first of the at least two elements, wherein the first thin conductive wire may be interrupted by a gap at a position between the resistance detection element and the one of the pair of conductive terminals for the first of the at least two elements; and a second thin conductive wire extending from the resistance detection element and terminating at one of a pair of conductive terminals for a second of the at least two elements, wherein the second thin conductive wire may be interrupted by a gap at a position between the resistance detection element and the one of the pair of conductive terminals for the second of the at least two elements.

In another general embodiment, a method for producing magnetic head sliders includes forming at least two elements for each magnetic head slider above a substrate wafer, the at least two elements being selected from a group consisting of a read element, a write element, and a heater element; forming, for each magnetic head slider, a resistance detection element above the substrate wafer near the at least two elements; forming, above the substrate wafer, a pair of conductive terminals for each of the at least two elements, the pair of conductive terminals being coupled to each of the at least two elements; coupling, using a first thin conductive wire, the resistance detection element for each magnetic head slider to one of a pair of conductive terminals for a first of the at least two elements; coupling the resistance detection element (using a second thin conductive wire) of each magnetic head slider to one of a pair of conductive terminals for a second of at least two elements; slicing the substrate wafer into a plurality of row-bars, each row-bar having a plurality of magnetic head sliders; polishing an air-bearing surface of the plurality of row-bars to provide a uniform element height to the plurality of magnetic head sliders of each row-bar while measuring a resistance of the resistance detection element for each magnetic head slider; and severing the first and second thin conductive wires to decouple the resistance detection element from the first and second of the at least two elements for each magnetic head slider.

To further reduce the cost of producing hard disk drives (HDDs), more efficient fabrication designs and methods that can enable higher magnetic head slider yields from wafer precursors would be very beneficial. However, thinner magnetic head sliders suffer from a decrease in magnetic head slider side surface area resulting from corresponding reductions in conductive terminal size and pitch. To enable resistance detection in this configuration, extremely thin, fine conductive wires connect the resistance detection element and the polisher sensing pod. In many cases, the reduced conductive terminal size results in a detriment to the coupling strength and conductive wires may ultimately peel away during polishing, resulting in no coupling at all. Alternatively, conductive wires for resistance detection may contact conductive terminals for the read and/or write element and produce noise in the resistance detection process, reducing the precision of resistance measurements.

Therefore, to overcome these deficiencies, a thin-femto magnetic head slider capable of robustly and precisely detecting the resistance of a resistance detection element during air bearing surface (ABS) polishing, and a method for fabricating the same, are described below according to various embodiments.

Referring now to FIG. 1, there is shown a disk drive 100 in accordance with one embodiment of the present invention. As shown in FIG. 1, at least one rotatable magnetic disk 112 may be supported on a spindle 114 and rotated by a disk drive motor 118. The magnetic recording on each disk may be typically in the form of an annular pattern of concentric data tracks (not shown) on the disk 112.

At least one slider 113 may be positioned near the disk 112, each slider 113 supporting one or more magnetic read/write heads 121. As the disk rotates, slider 113 may be moved radially in and out over disk surface 122 so that heads 121 may access different tracks of the disk where desired data are recorded and/or to be written. Each slider 113 may be attached to an actuator arm 119 by means of a suspension 115. The suspension 115 provides a slight spring force which biases slider 113 against the disk surface 122. Each actuator arm 119 may be attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air-bearing between slider 113 and disk surface 122 which exerts an upward force or lift on the slider. The air-bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap may be formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point may be where the second pole piece begins to widen (flare) to form the yoke. The placement of the flare point directly affects the magnitude of the magnetic field produced to write information on the recording medium.

Figure 2B:
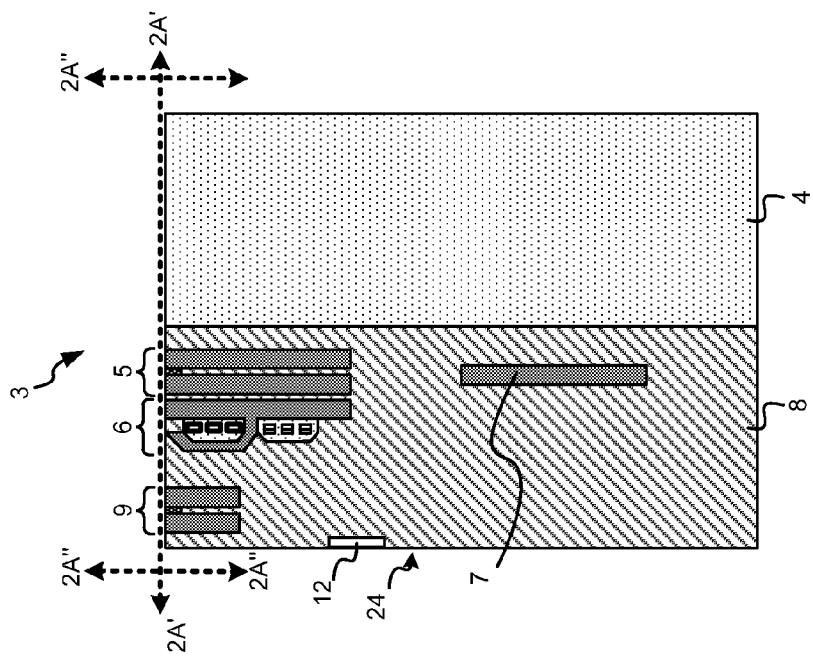
FIG. 2B is a cross-sectional schematic view of a magnetic head slider, according to the prior art.
Figure 2A:
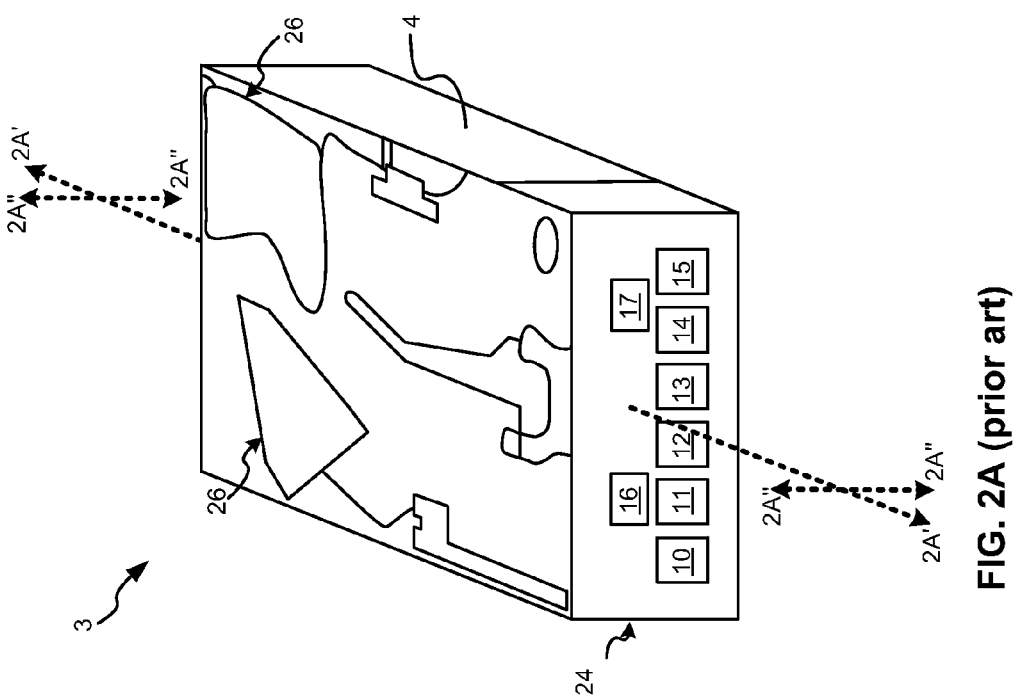
FIG. 2A is an isometric view of a magnetic head slider, according to the prior art.

Referring now to prior art FIG. 2A, an isometric view of a conventional magnetic head slider 3 is shown. FIG. 2B provides a cross-sectional schematic view of the conventional magnetic head slider 3 taken along a plane defined by the orthogonal dotted lines, 2A' and 2A", shown in FIG. 2A. As shown, FIG. 2B shows several elements that are unable to be viewed in the isometric view presented in FIG. 2A. As shown in FIG. 2B, a conventional magnetic head slider 3 comprises a read element 5, a write element 6, and a heater element 7 formed at an end face of a substrate 4 comprising AlTiC and a protective film 8 comprising alumina ($Al_2O_3$). Furthermore, in order to detect resistance in an ABS, a resistance detection element 9 is formed in proximity to the read element 5, as also shown in FIG. 2B. The read element 5, write element 6, heater element 7, and resistance detection element 9 are each coupled via fine gold wires (not shown in FIGS. 2A-2B) to a pair of gold terminals formed in a side surface 24 of the magnetic head slider 3.

The read element 5 is coupled to a first read element gold terminal 11 and a second read element gold terminal 12, write element 6 is coupled to a first write element gold terminal 13 and a second write element gold terminal 14, heater element 7 is coupled to a first heater element gold terminal 10 and a second heater element gold terminal 15, and resistance detection element 9 is coupled to a first resistance detection element gold terminal 16 and a second resistance detection element gold terminal 17. Per the isometric and cross-sectional views provided in FIGS. 2A and 2B, respectively, the read element 5, write element 6, heater element 7, and resistance detection element 9 are shown in FIG. 2B, and their respective gold terminals (e.g. 10-17) are shown in FIG. 2A. Finally, ABS rails 26 adapted for producing an ABS of several nanometers are formed by ion milling on the magnetic head slider surface opposite the magnetic disk With continuing reference to FIGS. 2A and 2B, the conventional magnetic head slider 3 is typically produced by a method summarized in seven steps.

First, read elements 5, write elements 6, and heater elements 7 are formed on a substrate 4 by conventional processes such as plating, sputtering, and polishing. Second, the protective film 8 comprising alumina is formed by sputtering above each of the read elements 5, write elements 6, and heater elements 7 to cover each of the read elements 5, write elements 6, and heater elements 7 and the substrate 4. Third, through-holes (not shown in FIGS. 2A-2B) in the protective film 8 are formed and the read element 5 is connected with gold terminals 11 and 12, the write element 6 is connected with first and second write element gold terminals 13 and 14, respectively, the heater element 7 is connected with first and second heater elements gold terminals 10 and 15, respectively, and the resistance detector element 9 is connected with its first and second resistance detector element gold terminals 16 and 17, respectively, using Au, Ag, Cu, or NiFe. The first and second resistance detector element gold terminals 16 and 17 (e.g. shown in FIG. 2A) are coupled to the resistance detection element 9 (e.g shown in FIG. 2B) and a resistance detection pod of the polisher (not shown), by, for example, fine gold wires (not shown) having a diameter of 30 µm. Fourth, using a cutting grindstone, the substrate 4 is ground and cut into row-bars each containing a number of magnetic head sliders on the order of 100.

Fifth, the ABS is finished and polished on a side opposite the magnetic disk, determining element height and measuring the resistance of the resistance detection element 9 in the process. This resistance value is configured to the element height, and then polishing pressure is controllably applied to the row-bar in order to produce a constant element height for each element in the row-bar. In conventional approaches, the fine gold wires coupling each element to its respective gold terminals are subject to wear and breakage during the polishing and finishing process, undesirably rendering a subset of units unfit for use and increasing fabrication resource expenditures. Sixth, ABS rails are formed on the ABS of each row-bar by ion milling. The ABS rails control a fly-height of the magnetic head slider 3 with nanometer-scale precision. Finally, in a seventh step, each row-bar is cut into individual finalized magnetic head sliders 3.

According to one embodiment, a method for producing a magnetic head slider, particularly a thin-femto slider, which is a thin magnetic head slider, comprises sharing the conductive pads of the resistance detection element used in the polishing process of the ABS with another element. This results in limiting the deterioration of the detected number of resistance detection elements caused by broken wires, and the element height of the magnetic head slider may be formed at a high yield.

Referring now to FIGS. 3-7, which depict a thin-femto magnetic head slider, one having ordinary skill in the art will appreciate from the following detailed description of various embodiments that the proposed thin-femto magnetic head slider offers convenient and advantageous features of conventional approaches to producing magnetic head sliders, with the added benefit that extremely thin magnetic head sliders may be produced efficiently from thin-wafer without deterioration in the coupling strength of fine conductive wires as experienced in conventional magnetic head sliders described above.

Figure 7:
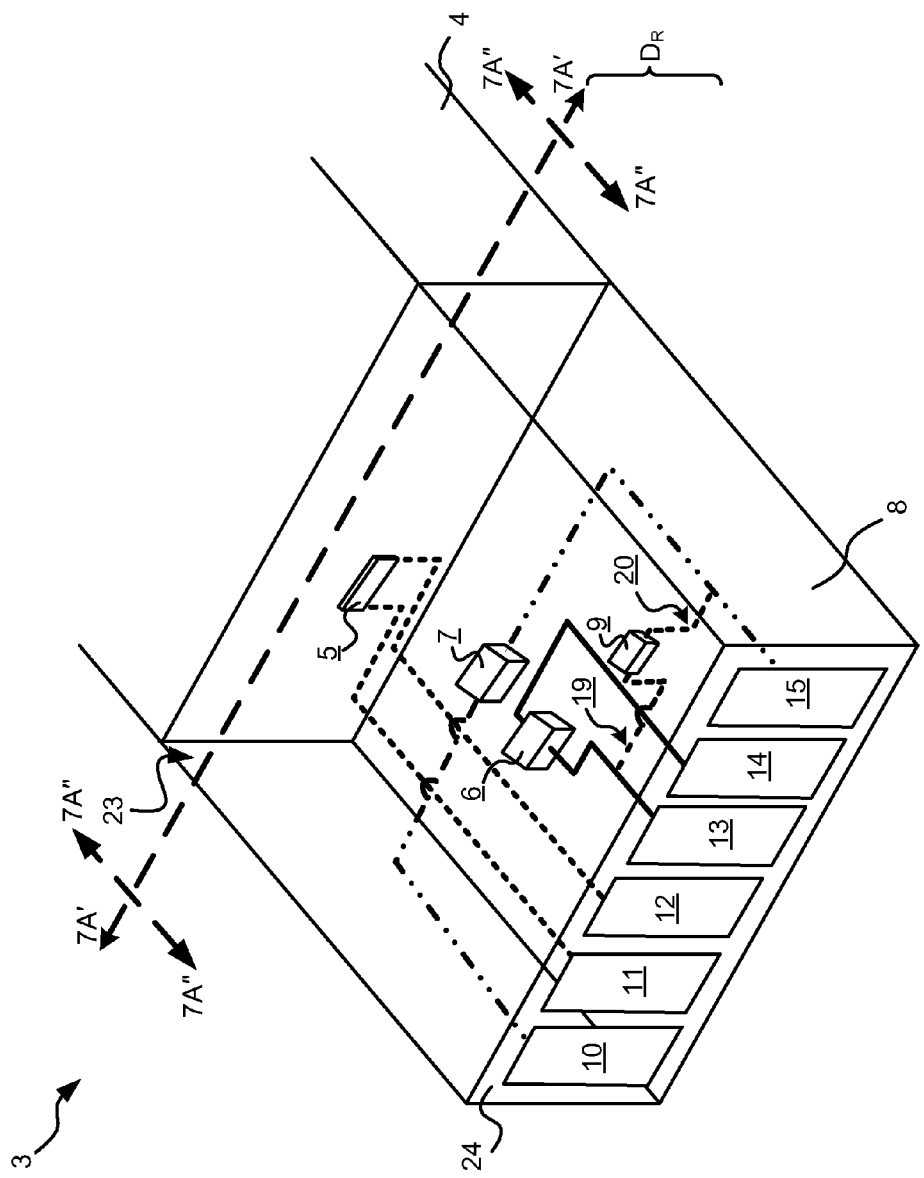
FIG. 7 is an isometric view of a thin-femto magnetic head slider, according to numerous embodiments.

Referring specifically now to FIGS. 3 and 7, a cross-sectional and isometric view of a thin-femto magnetic head slider are shown, respectively, according to one embodiment. As shown, the thin-femto magnetic head slider 3 comprises a read element 5, a write element 6, and a heater element 7 formed at an end face of a substrate 4. In some embodiments, a protective film 8 comprising alumina ($Al_2O_3$) may protect the elements. In another embodiment, the substrate may comprise AlTiC, among other suitable materials as would be known to one of skill in the art. Furthermore, in order to detect resistance in an ABS, a resistance detection element 9 may be formed in proximity to at least the read element 5. The read element 5, write element 6, heater element 7, and resistance detection element 9 are each coupled via fine conductive wires to a pair of conductive terminals formed in a side surface 24 of the magnetic head slider 3. Each conductive terminal comprises elements characterized by having a low electrical resistance, such as Au, Ag, Cu, NiFe, and alloys thereof. The read element 5 may be coupled to a first read element conductive terminal 11 and a second read element conductive terminal 12, the write element 6 may be coupled to a first write element conductive terminal 13 and a second write element conductive terminal 14, the heater element 7 may be coupled to a first heater element conductive terminal 10 and a second heater element conductive terminal 15, and the resistance detection element 9 may be coupled to a first resistance detection element conductive terminal 16 and a second resistance detection element conductive terminal 17. Finally, ABS rails adapted for producing an ABS of several nanometers are formed by ion milling on the magnetic head slider 3 surface opposite a magnetic disk (not shown).

Figure 3A:
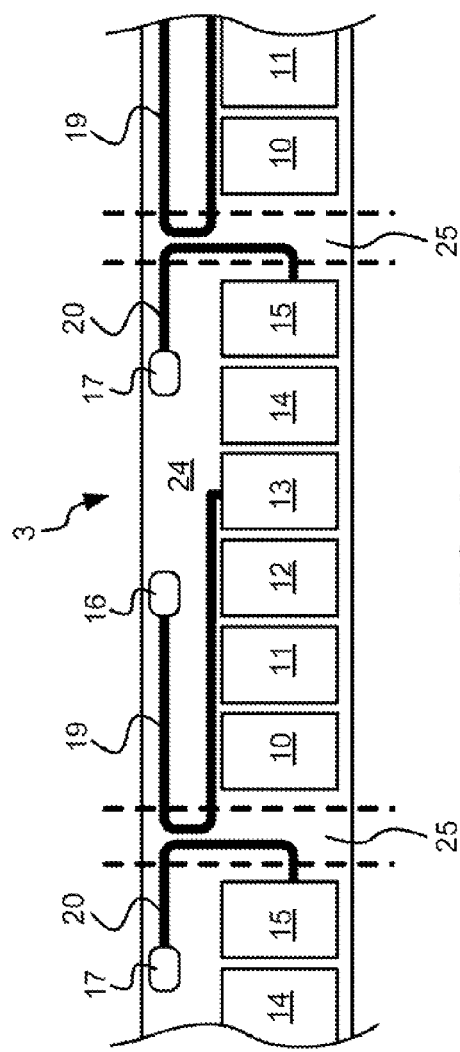
FIG. 3A is a cross-sectional schematic view of a thin-femto magnetic head slider prior to being sliced from a row-bar, according to another embodiment.
Figure 3B:
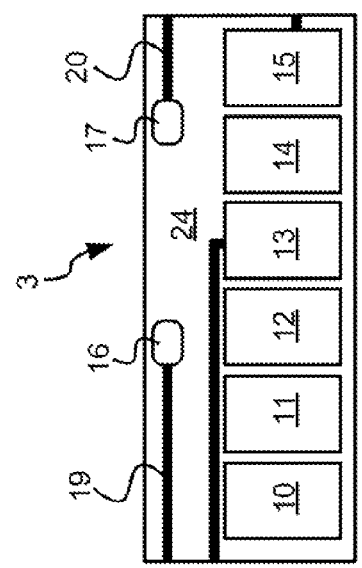
FIG. 3B is a cross-sectional schematic view of a thin-femto magnetic head slider, according to yet another embodiment.

In contrast to conventional magnetic head sliders, the embodiment depicted in FIG. 3A features additional couplings between conductive terminals of a read element (e.g. 5 in FIG. 2B), a write element (e.g. 6 in FIG. 2B), a heater element (e.g. 7 in FIG. 2B), and a resistance detector element (e.g. 9 in FIG. 2B). Specifically, a first resistance detector element conductive terminal 16 may be additionally coupled via a conductive wire 19 to a first write element conductive element 13. Similarly, a second resistance detection element conductive terminal 17 may be additionally coupled via a conductive wire 20 to a second heater element conductive terminal 15. Furthermore, conductive wires 19 and 20 protrude into a first break region 25 defining a boundary between each of the plurality of individual magnetic head sliders 3 comprising a row-bar. As shown in FIG. 3B, at a later stage of fabrication, each row-bar may be separated into individual magnetic head sliders 3 by cutting, concurrently severing conductive wires 19 and 20 in the first break regions 25.

Whereas conventional magnetic head sliders as shown in FIGS. 2A-2B require forming the fine conductive wires on the side surface 24 of the magnetic head slider concurrently with the conductive terminals 10-17, a preferred embodiment as shown in FIGS. 3A-3B advantageously permits flexible formation of conductive wires 19 and 20 in any portion of the protective film 8 because the wires may subsequently be cut in first break region 25 to produce the desired connectivity and limit noise contributed by the resistance detection element 9 during read and write operations. Furthermore, the above-described additional couplings between conductive wires 19 and 20 and conductive terminals 13 and 15 may increase coupling area and limit frequency of breakage resulting from coupling strength deterioration during polishing. An overall reduction in the size of resistance detector element conductive terminals 16 and 17 may be yet another advantage provided by coupling conductive wires 19 and 20 to conductive terminals 13 and 15. Flexible ability to reduce resistance detection element conductive terminal size ensures adequate flexibility in the size of read element conductive terminals 11 and 12, write element conductive terminals 13 and 14, and heater element conductive terminals 10 and 15, producing coupling strength robust to deterioration during polishing and finishing, in some approaches.

It will be appreciated that, while the preferred embodiment described in FIGS. 3A-3B above teaches a particular wiring pattern coupling the first and second resistance detector element conductive terminals 16 and 17 to write element conductive terminal 13 and heater element conductive terminal 15, respectively, similar advantages over conventional magnetic head sliders may be achieved by employing alternate wiring patterns and coupling schemes. For example, alternative embodiments may include coupling read element conductive terminals 11 and 12 to write element conductive terminals 13 and 14, heater element conductive terminals 10 and 15, resistance detection element conductive terminals 16 and 17, or any combination thereof via conductive wires 19 and 20, as would be understood by one having ordinary skill in the art upon reading the present descriptions.

Figure 4A:
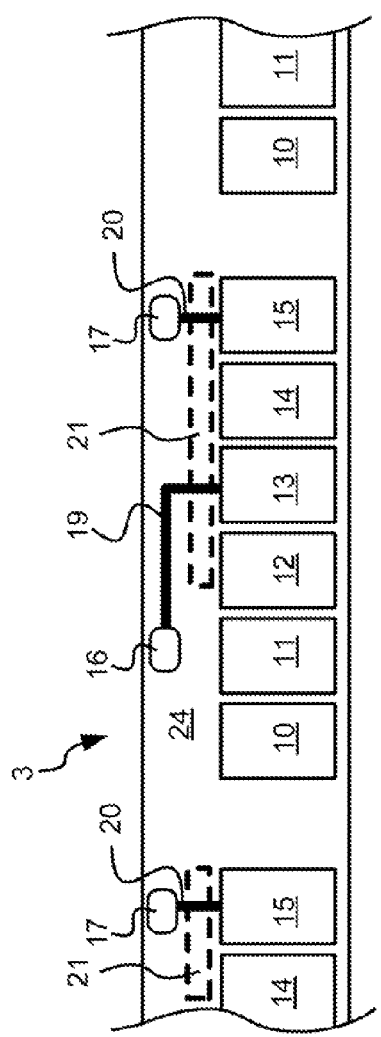
FIG. 4A is a cross-sectional schematic view of a thin-femto magnetic head slider prior to being sliced from a row-bar, according to an additional embodiment.

One alternative embodiment of a thin-femto magnetic head slider may mitigate imprecise conversion of resistance detector element resistance to element height as compared to the embodiment as depicted in FIGS. 3A-3B. As shown in FIG. 4A, a thin-femto magnetic head slider 3 may be substantially similar to the embodiment as depicted in FIG. 3A, with the distinction that conductive wires 19 and 20 do not extend beyond the lateral boundary of conductive terminals 10-17 into first break region 25, as in FIG. 3A. Instead, as shown in FIG. 4A, the second write element conductive terminal 13 may be coupled to the first resistance detector element 16 via conductive wire 19 and the second heater element conductive terminal 15 may be coupled to the second resistance detector element 17 via a short, straight conductive wire 20. Reducing the length of conductive wires 19 and 20, as compared to the configuration shown in FIG. 3A, may reduce the influence of conductive wire electrical resistance, thus reducing imprecision when converting resistance of the resistance detection element to the element height.

Figure 4B:
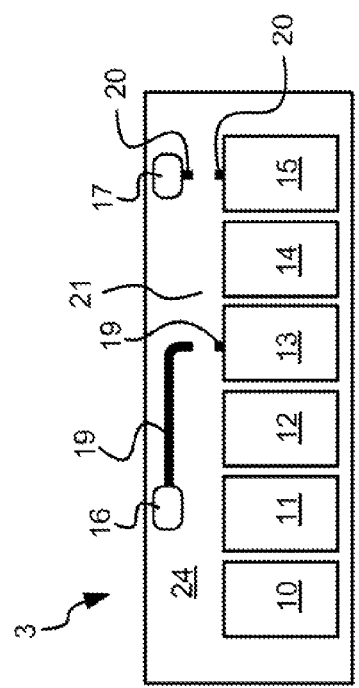
FIG. 4B is a cross-sectional schematic view of a thin-femto magnetic head slider, according to a further embodiment.

Notably, in the embodiment depicted in FIG. 4A, a second break region 21 replaces the first break region 25 as shown in the embodiment depicted in FIG. 3A, and after slicing the row-bar into individual magnetic head sliders, finishing, and polishing the ABS, as shown in FIG. 4B, an incision may be made along the boundaries of the second break region 21 by slicing with a diamond grindstone, laser, etc., as would be understood by one having ordinary skill in the art upon reading the present descriptions. In this manner, reductions in resistance detection element noise contribution during read and/or write operations may be achieved.

It will be appreciated that, while the embodiment described in FIGS. 4A-4B above teaches a particular wiring pattern coupling the first and second resistance detector element conductive terminals 16 and 17 to write element conductive terminal 13 and heater element conductive terminal 15, respectively, similar advantages over conventional magnetic head sliders may be achieved by employing alternate wiring patterns and coupling schemes. For example, alternative embodiments may include coupling read element conductive terminals 11 and 12 to write element conductive terminals 13 and 14, heater element conductive terminals 10 and 15, resistance detection element conductive terminals 16 and 17, or any combination thereof via conductive wires 19 and 20 as would be understood by one having ordinary skill in the art upon reading the present descriptions.

FIG. 5 illustrates yet another embodiment of a thin-femto magnetic head slider 3. Of course, as shown in previous embodiments, the row-bar may be sliced into individual magnetic head sliders and the incisions, cuts, or slices may, be made where indicated by the break region 22. In this embodiment, conductive wires 19 and 20 couple first write element conductive terminal 13 to first resistance detector element conductive terminal 16, and second heater element conductive terminal 15 to second resistance detector element conductive terminal 17. In the embodiment as shown in FIG. 5, conductive wires 19 and 20 are formed in positions overlapping a third break region 22 such that each conductive wire 19 and 20 may be severed in the process of forming the ABS rails in third break region 22. Therefore, in the embodiment depicted in FIG. 5, additional cutting steps as required in alternate embodiments and described in FIGS. 4A-4B are unnecessary and the fabrication process may be simplified. In one potential embodiment, the ABS rails may be formed by ion milling to a user-specified depth $D_R$, using the ABS as a reference, and conductive wires 19 and 20 may be formed at a depth from the ABS of no greater than the user-specified depth $D_R$ to ensure complete severing of the wires upon formation of the ABS rails and to prevent noise contributions during read and/or write operations.

Referring now to FIG. 6, another potential embodiment of a thin-femto magnetic head slider 3 employs direct connections. Of course, as shown in previous embodiments, the row-bar may be sliced into individual magnetic head sliders and the incisions, cuts, or slices may be made where indicated by the break region 25. Specifically, resistance detector element 9 may be directly coupled to second write element conductive terminal 13 via conductive wire 19, and resistance detector element 9 may be additionally directly coupled to second heater element conductive terminal 15 via conductive wire 20. Since the resistance detector element is not on the surface 24, it is shown in dashed lines. Alternatively, in some embodiments of a thin-femto magnetic head slider, the direct coupling scheme shown in FIG. 6 may replace the indirect coupling scheme employed in other embodiments, including those embodiments shown in FIGS. 3A, 3B, 4A, 4B, and 5, according to various embodiments.

Referring now to FIG. 7, an isometric view of a thin-femto magnetic head slider 3 is shown, according to one embodiment. In the embodiment shown, resistance detection element 9 may be formed at a depth $D_R$ from the ABS in a direction perpendicular to a plane of the air-bearing surface 23 (where said plane is defined by the orthogonal lines 7A' and 7A") of no greater than the depth of the ABS rails from the ABS. In this configuration, the process of forming the ABS rails, such as via ion-milling, etc., in the air-bearing surface 23 may concurrently sever conductive wires 19 and 20, which connect the resistance detection element 9 to the write element 6 and the heater element 7, respectively, as well as remove resistance detection element 9 from the magnetic head slider 3. Therefore, the ion-milling process to form the air-bearing surface rails obviates additional cutting steps as required in the other embodiments described above, simplifying manufacture and design.

Figure 8:
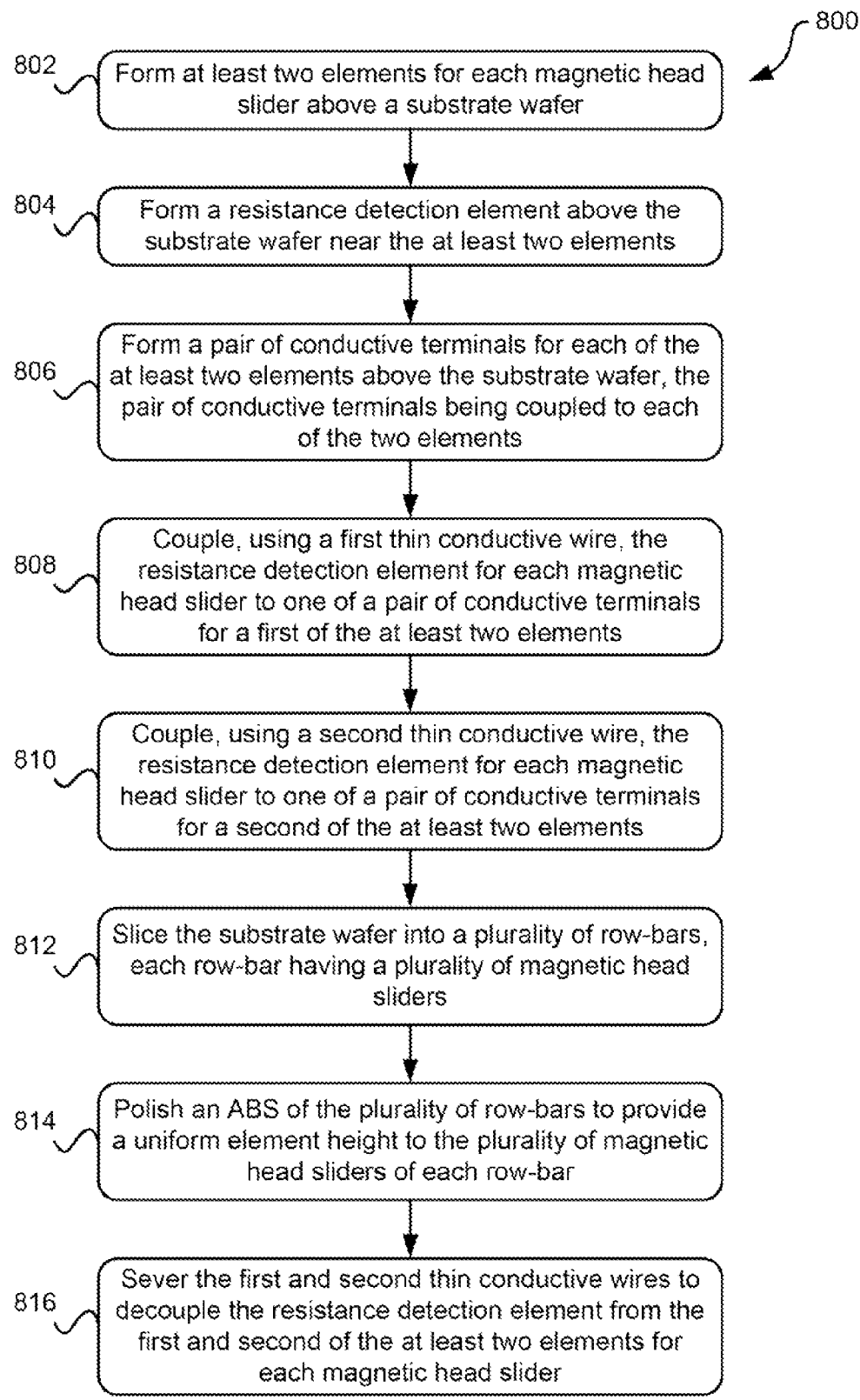
FIG. 8 is a flowchart of a method for producing a thin-femto magnetic head slider, according to more embodiments.

Referring now to FIG. 8, a method 800 for producing magnetic head sliders is shown according to one embodiment. The method 800 may be carried out in any desired environment, and may include more or less operations than those described below in relation to FIG. 8.

In operation 802, at least two elements for each magnetic head slider are formed above a substrate wafer, the at least two elements being selected from a group consisting of: a read element, a write element, and a heater element.

In operation 804, for each magnetic head slider, a resistance detection element is formed above the substrate wafer near the at least two elements.

In operation 806, a pair of conductive terminals for each of the at least two elements are formed above the substrate wafer, the pair of conductive terminals being coupled to each of the at least two elements.

In operation 808, using a first thin conductive wire, the resistance detection element for each magnetic head slider is coupled to one of a pair of conductive terminals for a first of the at least two elements.

In operation 810, using a second thin conductive wire, the resistance detection element for each magnetic head slider is coupled to one of a pair of conductive terminals for a second of the at least two elements.

In operation 812, the substrate wafer is sliced into a plurality of row-bars, each row-bar having a plurality of magnetic head sliders.

In operation 814, an ABS of the plurality of row-bars is polished to provide a uniform element height to the plurality of magnetic head sliders of each row-bar while measuring a resistance of the resistance detection element for each magnetic head slider.

In operation 816, the first and second thin conductive wires are severed to decouple the resistance detection element from the first and second of the at least two elements for each magnetic head slider. This operation may be performed simultaneously with operation 814, in some embodiments.

In one embodiment, the method 800 may include forming, above the substrate wafer, a pair of conductive terminals for the resistance detection element for each magnetic head slider, the pair of conductive terminals for the resistance detection element being adapted for coupling the resistance detection element to one of a pair of conductive terminals for two different elements selected from a group consisting of: a read element, a write element, and a heater element. In a further embodiment, coupling the resistance detection element for each magnetic head slider to one of a pair of conductive terminals for a first of the at least two elements and coupling the resistance detection element for each magnetic head slider to one of a pair of conductive terminals for a second of the at least two elements comprises: coupling, using the first thin conductive wire, a first of the pair of conductive terminals for the resistance detection element to the one of the pair of conductive terminals for the first of the at least two elements; and coupling, using the second thin conductive wire, a second of the pair of conductive terminals for the resistance detection element to the one of the pair of conductive terminals for the second of the at least two elements.

In one approach, the method 800 may include forming a protective layer above the substrate wafer, the protective layer being adapted for protecting the at least two elements for each magnetic head slider.

In another embodiment, the substrate wafer may comprise aluminum titanium carbide (AlTiC).

According to yet another embodiment, the pair of conductive terminals for each of the at least two elements may comprise at least one of: gold (Au), silver (Ag), copper (Cu), nickel-iron (NiFe), and alloys thereof.

In another embodiment, the first and second thin conductive wires may comprise at least one of: gold (Au), silver (Ag), copper (Cu), nickel-iron (NiFe), and alloys thereof.

In one embodiment, severing the first and second thin conductive wires may comprise using a laser or a diamond grindstone to cut the first and second thin conductive wires.

In another approach, severing the first and second thin conductive wires may comprise slicing each of the plurality of row-bars to produce single magnetic head sliders, as previously described.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head slider, comprising:
   a substrate;
   at least two elements positioned adjacent to the substrate, the elements being selected from a group consisting of: a read element, a write element, and a heater element;
   a resistance detection element positioned near the at least two elements;
   a pair of conductive terminals for each of the at least two elements, each pair of conductive terminals being in an accessible position and being coupled to the associated element;
   a first thin conductive wire electrically coupled to the resistance detection element and terminating at a first edge of the slider;
   a second thin conductive wire electrically coupled to the resistance detection element and terminating at a second edge of the slider;
   a third thin conductive wire extending from one of the conductive terminals for a first of the at least two elements and terminating at the first edge of the slider; and
   a fourth thin conductive wire extending from one of the conductive terminals for a second of the at least two elements and terminating at the second edge of the slider.

2. The magnetic head slider as recited in claim 1, further comprising a pair of conductive terminals for the resistance detection element, wherein the pair of conductive terminals are coupled to the resistance detection element.

3. The magnetic head slider as recited in claim 2, wherein a portion of the first thin conductive wire extends from a first of the pair of conductive terminals for the resistance detection element and terminates at the first edge of the slider, and wherein a portion of the second thin conductive wire extends from a second of the pair of conductive terminals for the resistance detection element and terminates at the second edge of the slider.

4. The magnetic head slider as recited in claim 1, further comprising a protective film above the at least two elements and the resistance detection element.

5. The magnetic head slider as recited in claim 1, wherein the substrate comprises aluminum titanium carbide (AlTiC).

6. The magnetic head slider as recited in claim 1, wherein the pair of conductive terminals for the at least two elements comprise at least one of: gold (Au), silver (Ag), copper (Cu), nickel-iron (NiFe), and alloys thereof.

7. The magnetic head slider as recited in claim 1, wherein the first, second, third, and fourth thin conductive wires comprise at least one of: gold (Au), silver (Ag), copper (Cu), nickel-iron (NiFe), and alloys thereof.

8. A magnetic data storage system, comprising:
   a magnetic medium;
   at least one magnetic head slider as recited in claim 1, each magnetic head slider comprising a magnetic head for reading from/writing to the magnetic medium;
   a drive mechanism for passing the magnetic medium over the magnetic head; and
   a controller electrically coupled to the magnetic head for controlling operation of the magnetic head.

9. A magnetic head slider, comprising:
   a substrate;
   at least two elements positioned adjacent to the substrate, the elements being selected from a group consisting of: a read element, a write element, and a heater element;
   a resistance detection element positioned above the substrate;
   a pair of conductive terminals for each of the at least two elements, each pair of conductive terminals being coupled to the associated element;
   a first conductive wire electrically coupled to the resistance detection element and terminating at a first edge of the slider;
   a second conductive wire electrically coupled to the resistance detection element and terminating at a second edge of the slider;
   a third conductive wire extending from one of the conductive terminals for a first of the at least two elements and terminating at the first edge of the slider; and
   a fourth conductive wire extending from one of the conductive terminals for a second of the at least two elements and terminating at the second edge of the slider.

10. The magnetic head slider as recited in claim 9, further comprising a pair of conductive terminals for the resistance detection element, wherein the pair of conductive terminals are coupled to the resistance detection element.

11. The magnetic head slider as recited in claim 10, wherein a portion of the first conductive wire extends from a first of the pair of conductive terminals for the resistance detection element and terminates at the first edge of the slider, and wherein a portion of the second conductive wire extends from a second of the pair of conductive terminals for the resistance detection element and terminates at the second edge of the slider.

12. The magnetic head slider as recited in claim 9, further comprising a protective film above the at least two elements and the resistance detection element.

13. The magnetic head slider as recited in claim 9, wherein the substrate comprises aluminum titanium carbide (AlTiC).

14. The magnetic head slider as recited in claim 9, wherein the pair of conductive terminals for the at least two elements comprise at least one of: gold (Au), silver (Ag), copper (Cu), nickel-iron (NiFe), and alloys thereof.

15. The magnetic head slider as recited in claim 9, wherein the first, second, third, and fourth conductive wires comprise at least one of: gold (Au), silver (Ag), copper (Cu), nickel-iron (NiFe), and alloys thereof.

16. A magnetic data storage system, comprising:
a magnetic medium;
at least one magnetic head slider as recited in claim 9, each magnetic head slider comprising a magnetic head for reading from/writing to the magnetic medium;
a drive mechanism for passing the magnetic medium over the magnetic head; and
a controller electrically coupled to the magnetic head for controlling operation of the magnetic head.

* * * * *